Patented Nov. 17, 1931

1,831,895

UNITED STATES PATENT OFFICE

WALLACE B. VAN ARSDEL AND ROGER B. HILL, OF BERLIN, NEW HAMPSHIRE, ASSIGNORS TO BROWN COMPANY, OF BERLIN, NEW HAMPSHIRE, A CORPORATION OF MAINE

LATEX COMPOSITION AND PROCESS OF MAKING

No Drawing.   Application filed July 23, 1929.   Serial No. 380,454.

Aqueous rubber dispersions, such as latex in stabilized or preserved condition, find diverse commercial applications, for instance, for the coating or impregnation of bodies, e. g., fibrous sheet material. The rubber is coagulated in a continuous, coherent condition when the dispersion-treated body is dried, and imparts such properties as waterproofness and strength to the body. It is sometimes desired that the rubber be present in a vulcanized condition in the body, as vulcanized rubber is free from tackiness and has much higher tensile strength than unvulcanized rubber. The rubber particles of an aqueous rubber dispersion, such as latex, may be vulcanized by the so-called Schidrowitz process, which involves adding vulcanizing agents such as sulphur, preferably along with accelerators of vulcanization, to the dispersion, and then heating the dispersion to effect vulcanization of the rubber particles but without causing coagulation (see U. S. Patent No. 1,443,149, issued January 23, 1923, to Philip Schidrowitz). When a vulcanized dispersion is used for coating or impregnation purposes and the dispersion-treated body is then dried to effect coagulation of the rubber, the resulting rubber coagulum exists in a vulcanized condition, so that the step of subsequent heating of the body to effect vulcanization may be avoided.

It is known that the characteristics of a vulcanized dispersion, such as vulcanized latex, may be accurately controlled or varied by blending or mixing an unvulcanized dispersion therewith. Such a method is particularly advantageous when ultra accelerators are used in effecting the vulcanization of aqueous rubber dispersions, such as latex, as in such case it is difficult to control the degree of vulcanization in the resulting product, vulcanization often proceeding beyond the stage desired. By the simple expedient of blending an unvulcanized latex with the vulcanized latex, it is possible to restore the vulcanized latex to the condition desired for use. Such a method is also particularly advantageous when it is desired to concentrate and/or purify a vulcanized latex by the use of so-called creaming agents, as we have discovered that whereas little, if any, concentration and/or purification of a vulcanized latex may be effected by the addition of creaming agents thereto, it is possible to effect a marked concentration and/or purification of a mixture of vulcanized and unvulcanized latices. Various creaming agents which do not cause coagulation of the rubber, such as gums or pectin-containing gels, may be used to cause "creaming" or separation into a concentrated rubber-containing portion or top layer containing a lower percentage of non-rubber constituents than the original latex, and a lower aqueous layer or serum, whereupon the rubber-containing portion may be recovered. The amount of serum separated from a mixture or blend of natural and vulcanized latex depends upon the amount of natural latex added to the vulcanized latex. The creaming agent, e. g., gum tragacanth, plant sap, or fruit juices, may be added in amount equal to about 10% by volume of the mixture of latices and in the form of about a 2% solution. The rate of creaming may be increased by heating the mixture of latices containing the creaming agent for a short period of time, a temperature of 70° C., for instance, being maintained for about one-half hour, whereupon the composition may be allowed to stand for about five to twenty-four hours, or possibly a week, to ensure maximum separation of the concentrated rubber-containing portion from the aqueous portion.

The following table gives the results obtained with different proportions of natural and vulcanized latices:

| Material | Per cent solids | Vol. of cream | Vol. of serum | Solids in cream | Solids in serum |
|---|---|---|---|---|---|
| | | Per cent | Per cent | Per cent | Per cent |
| Natural latex | 25.5 | 30 | 70 | 55 | 6 |
| 75% natural latex 25% vulcanized latex | 26.0 | 40 | 60 | 53.6 | 5.5 |
| 50% natural latex 50% vulcanized latex | 25.5 | 50 | 50 | 40.0 | 3.4 |
| 25% natural latex 75% vulcanized latex | 25.4 | 70 | 30 | 31.8 | 5.1 |
| Vulcanized latex | 25.9 | 80 | 20 | 30.0 | 4.0 |

From the foregoing table, it is seen that while considerable creaming is effected in the case of a mixture containing 50% or more of natural latex, comparatively little creaming above that obtained when using vulcanized latex is effected in the case of a mixture containing about 25% natural latex.

The steps of mixing unvulcanized latex with natural latex, of adding creaming agents to effect concentration and/or purification, and of recovering the creamed portion, may be applied to advantage when it is desired to produce a rubber coagulum of predetermined tensile strength. The tensile strength and stretch characteristics of rubber films made with various mixtures of natural and vulcanized latices are given in the following tables:

| Material | Tensile strength lbs./sq. in. | Per cent stretch |
|---|---|---|
| Natural latex | 680 | 760 |
| 75% natural latex 25% vulcanized latex | 1025 | 775 |
| 50% natural latex 50% vulcanized latex | 1130 | 775 |
| 25% natural latex 75% vulcanized latex | 1765 | 800 |
| Vulcanized latex | 2810 | 750 |

It is thus seen that the strength characteristics of the rubber coagulum obtainable from latex may be controlled within a comparatively wide range. Characteristics other than strength, such as toughness, although not given in the table, are also capable of being controlled by the process of the present invention.

Vulcanization of the latex may be effected under various conditions, one procedure, for example, being to add about 2% sulphur (based on the solids content of the latex), 0.5% of an accelerator such as piperidene penta-methylene dithiocarbamate, about 5% of zinc oxide, heating to about 75° C. and maintaining this temperature for about two and a half hours. Evidently vulcanization modifies certain non-rubber constituents of the latex along with the rubber, as attested by the fact that the property of undergoing creaming possessed by the natural latex is almost lacking in the vulcanized product. If desired, selenium may be used in lieu of sulphur, as a vulcanizing agent, as described in the application of Roger B. Hill, Serial No. 380,468, filed July 23, 1929.

It should be evident to those skilled in the art that the composition of the present invention and its mode of preparation may be subject to various changes and modifications without departing from the spirit or scope of invention as defined in the appended claims.

We claim:

1. A process which comprises mixing vulcanized latex with more than 25% unvulcanized latex, adding a creaming agent, and recovering the creamed portion of the mixture.

2. A composition of matter comprising a creamed, concentrated mixture of vulcanized latex and more than 25% unvulcanized latex.

3. A composition of matter comprising a purified, concentrated mixture of vulcanized latex and more than 25% unvulcanized latex, which composition has resulted from creaming and separating from a substantial portion of the water component of the unconcentrated mixture and the non-rubber solids present in such water component.

In testimony whereof we have affixed our signatures.

WALLACE B. VAN ARSDEL.
ROGER B. HILL.